UNITED STATES PATENT OFFICE.

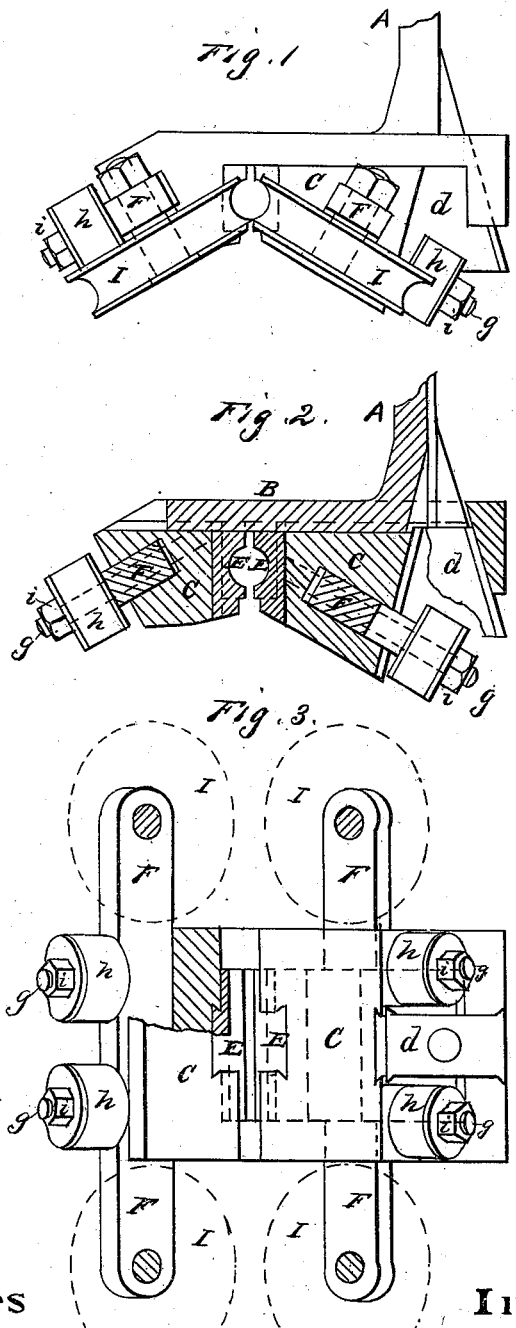

WILLIAM EPPELSHEIMER, OF SAN FRANCISCO, CALIFORNIA.

IMPROVEMENT IN GRIPERS FOR ROPEWAYS.

Specification forming part of Letters Patent No. 174,358, dated March 7, 1876; application filed July 8, 1875.

*To all whom it may concern:*

Be it known that I, WILLIAM EPPELSHEIMER, of San Francisco city and county, State of California, have invented an Improved Griping Device for Ropeways; and I do hereby declare the following description and accompanying drawings are sufficient to enable any person skilled in the art or science to which it most nearly appertains to make and use my said invention or improvement without further invention or experiment.

My invention relates to that class of griping apparatus which is used for connecting an underground or submerged endless rope with a car or other vehicle or vessel above it, and is an improvement upon the griping device for which Letters Patent No. 129,130 were issued to Andrew S. Hallidie on the 16th day of July, 1872.

My improvement consists in attaching the rope-supporting pulleys of the gripe to fixed journals on ends of parallel sliding bars, which are secured in the frames which carry the clamps, so arranging the parts that after the pulleys have been pressed into contact with the rope the grappling-jaws may be caused to approach each other still farther, for the purpose of griping tightly the rope.

In order to more fully illustrate and explain my invention, reference is had to the accompanying drawing, forming a part of this specification, in which—

Figure 1 is an end view. Fig. 2 is a transverse section. Fig. 3 is a bottom view.

A is the shank, and B the foot or frame, of the griping device, the two parts being connected in the form of an L. C C are the sliding blocks, which carry the clamping-shoes and pulleys. These blocks are arranged to slide toward or from each other in grooves on the under side of the frame B by means of an inverted wedge, d, in the usual manner. In the meeting faces of the blocks C C I preferably secure shoes E E in dovetail slots, so that they can be removed or replaced at will by simply removing the blocks from the frame B. In the opposite faces of each of the blocks C C I make a recess or mortise, and in each recess or mortise I secure a bar, F. These bars are longer than the blocks, and extend a short distance to each side of it, as shown.

To fasten these bars in place I permanently secure one or more bolts or pins, $g$, in the blocks C, so that they will stand in the slot or recess at suitable points, and extend outside of it.

The bars F may be provided with holes corresponding with the bolts or pins $g$, so that when the bars are placed in slots the pins will pass through the holes. I then preferably place a thick india-rubber or other elastic washer or buffer, $h$, upon the outer end of the pins, and secure them by nuts $i$, as shown.

Thus it will be seen that the bars are secured in the slots by elastic or yielding fastenings, which will allow them to yield in an outward direction.

To the outer ends of each of the bars F, and on their under sides, I secure the rope-holding pulleys I I I I upon permanent fixed journals, which are secured in the ends of the bars; and, as the bars stand at an obtuse angle to each other, the pulleys will also stand at the same angle.

Now, when the blocks are closed together by the lifting of the wedge $d$, the griping-shoes E E and pulleys I I are moved simultaneously toward each other, the pulleys seizing the rope slightly in advance of the shoes. The final pressure, which closes the jaws or shoes E E upon the rope, forces the pulleys and bars slightly apart by compressing the springs or buffer $h$.

When it is desired to stop the vehicle or vessel, by loosening the gripe the wedge $d$ is lowered, so as to free the shoes from it; but the flanges of the pulleys and their closer adjustment causes them to retain their hold upon it while it moves easily between them.

By this means I provide a simple and strong arrangement of the pulleys, so that the griping attachment is greatly improved.

The removable shoe is recommended, as the griping-surfaces soon become worn and require renewal.

The bars E E and the pulleys I I I I may be arranged at any desired angle of inclination to the line of motion of the blocks C C, it only being requisite to adapt the peripheral faces of the pulleys to the angle of inclination, so as to grasp properly the ropes. Also, any device the equivalent of the springs $h\,h\,h\,h$ may be employed to give an elastic movement to the bars F F.

Having thus described my invention, what I claim, and desire to secure by Letters Patent, is—

The griping sliding blocks C C, the yielding bars F F, and the pulleys I I I I, arranged on axes fixed to the said bars, all constructed and combined to operate as and for the purpose described.

In witness whereof I hereunto set my hand and seal.

WILLIAM EPPELSHEIMER. [L. S.]

Witnesses:
 JNO. L. BOONE,
 C. M. RICHARDSON.